United States Patent
Hoaglin et al.

[11] Patent Number: 5,841,933
[45] Date of Patent: Nov. 24, 1998

[54] OPTICAL WAVEGUIDE FIBER CONTAINING TITANIA AND GERMANIA

[76] Inventors: Christine L. Hoaglin, 4748 Clawson Dr., Campbell, N.Y. 14821; Carlton M. Truesdale, R.D.#1 River Rd., Corning, N.Y. 14830

[21] Appl. No.: 869,272

[22] Filed: Jun. 4, 1997

Related U.S. Application Data

[60] Provisional application No. 60/021,371 Jul. 9, 1996.
[51] Int. Cl.[6] .................................................. G02B 6/00
[52] U.S. Cl. ............................ 385/142; 65/30.1; 65/385; 65/386
[58] Field of Search .................................. 501/54, 37, 55, 501/900; 65/30.1, 30.13, 386, 32.1, 387, 392, 398, 31, 403, 102, 404, 417, 424; 385/130, 142, 14, 129, 127, 123

[56] References Cited

U.S. PATENT DOCUMENTS

| | | | |
|---|---|---|---|
| 4,335,934 | 6/1982 | Black et al. | 65/398 |
| 5,262,365 | 11/1993 | Oyobe et al. | 65/30.1 |
| 5,500,031 | 3/1996 | Atkins et al. | 65/386 |
| 5,509,101 | 4/1996 | Gilliland et al. | 65/385 |

*Primary Examiner*—Akm E. Ullah
*Attorney, Agent, or Firm*—William J. Chervenak; Scott S. Servilla

[57] ABSTRACT

Optical waveguide core compositions comprising a core containing two dopants in a silica based glass, wherein one of the dopants is titania. The core composition serves to suppress the presence of $Ti^{-3}$ and to preserve refractive index profile shape throughout the preform manufacturing process.

14 Claims, 1 Drawing Sheet

OPTICAL WAVEGUIDE FIBER CONTAINING TITANIA AND GERMANIA

BACKGROUND

The invention is directed to an optical waveguide fiber having a silica based core containing titania and germania.

Titania is an efficient and effective silica based optical waveguide core dopant for several reasons.

The precursor chemicals which may be used in the optical waveguide preform process are readily available and are far less costly than other core dopant precursors, such as germania.

A smaller titania dopant concentration is required to produce a particular refractive index change as compared to other dopants, such as germania.

The effect of titania doping in silica is to lower the coefficient of thermal expansion of silica. Thus one may control the doped silica expansion, and in fact match the thermal expansions of silica and doped silica by co-doping a waveguide core with titania and a metal oxide which increases the coefficient of expansion of silica. In this way, higher doping levels can be achieved without producing a prohibitive thermal expansion mismatch between the optical waveguide fiber core and the silica cladding layer. For example, waveguide fiber having numerical apertures greater than 0.27 can be produced from a preform which is mechanically stable at room temperature.

Titania is less volatile in the drying and consolidation processes, known in the art, making possible improved control of refractive index profile shape and thus improved control of waveguide fiber properties.

Titania doping of optical waveguide fibers is discussed in the Japanese Patent Application Disclosure No. 60-5041 (1985). In that publication, a silica base waveguide fiber core is described which contains titania and at least two other doping materials. The weight percent of each dopant is chosen to provide for a core thermal expansion coefficient which is close to that of the silica clad. In most of the examples presented in the publication the amount of titania present in the waveguide core is much less than the amount of an additional dopant, which in all cases presented was germania. The concentrations of the additional dopants are not given. Thus no savings in material cost are expected and the function of titania as a refractive index increasing dopant is not exploited fully. The publication is focused on the use of titania as an agent for matching thermal expansion coefficients between silica glass and doped silica glass. That the refractive index increasing properties are at best of secondary interest is illustrated in the publication at page 8, third paragraph, ". . . the examples shown were those in which the dopants were added to the core; however, the dopants could also be added to the clad." Moreover, the subject publication makes no mention of waveguide fiber attenuation.

A major drawback encountered in using titania in optical waveguide manufacture is the formation in the core of the $Ti^{+3}$ species which is a strong light absorber especially in the 850 nm and 1310 nm regions of optical waveguide operation.

Thus there is a need for an optical waveguide fiber having a core containing titania wherein the full refractive index raising capability of the titania is used, and, cost savings on germania, and the other benefits, listed above, are realized. In addition, the problem of the absorbing species $Ti^{+3}$ must be addressed to reduce waveguide fiber attenuation to practical levels.

Furthermore, the complication and cost added to equipment and to the manufacturing process, by use of a third or a fourth dopant, should be avoided.

SUMMARY OF THE INVENTION

The invention described herein meets the needs for an optical waveguide fiber having the required properties noted above.

A first aspect of the invention is an optical waveguide fiber having a silica based core doped with titania and germania only. The clad glass layer, which is in contact with and surrounds the core, is essentially silica. Two core dopants, titania and germania are used. The titania dopant is no more than 7 weight % and the weight percent ratio of titania to germania is less than 1.

A particularly advantageous embodiment of this first aspect of the novel core composition is one in which the titania weight percent is no greater than 5% and the weight percent ratio of titania to germania is no greater than 0.3.

The embodiments of this first aspect wherein the coefficient of thermal expansion of core and clad are most nearly equal are preferred.

A particular refractive index core profile useful in this first aspect of the invention is an $\alpha$ profile, where $\alpha$ can take on values greater than 1. An $\alpha$ profile is described by the equation, $$n = n_o(1 - 2\Delta(r/a)^\alpha)^{1/2},$$

where $n_o$ is the refractive index at the first point of the alpha index profile, $\Delta = [(n_1^2 - n_c^2)/2n_1^2]$, where $n_1$ is a core index and $n_c$ is the clad index, r is radius, and a is the radius measured from the first to the last point of the alpha index profile, and r is chosen to be zero at the first point of the alpha index profile. Unless otherwise stated, $n_1$ is the maximum refractive index in the core region characterized by the $\Delta$. As can be noted by examining the equation, $\alpha=1$ is a triangular profile, $\alpha=2$ is parabolic, and $\alpha \geq$ about 4 is essentially a step index profile.

Because high doping levels are useful in multimode waveguide fibers, the core dimensions may be chosen to allow multimode light propagation. Multimode fiber is used in applications which are splicing intensive. To minimize splice loss, a high numerical aperture, one in the range of about 0.18 to 0.32 or higher, is preferred. The numerical aperture is given by $(n_1^2 - n_c^2)^{1/2}$, where $n_1$ is the maximum refractive index of the core and $n_c$ is the refractive of the clad. The numerical aperture is related to the maximum angle at which a light ray may be launched into the waveguide fiber core and still be guided. A preferred multimode embodiment of the invention is one having a numerical aperture of about 0.275 and a parabolic ($\alpha=2$) profile. High bandwidth in both the 850 nm and 1310 nm wavelength regions and low connecting or splicing loss is provided by this design.

It will be understood, that the invention is not limited to multimode waveguide fiber geometries.

In a second aspect of the invention, the focus is on adding a co-dopant to the titania doped, silica based core glass which serves to suppress the presence of the absorbing $Ti^{+3}$ species. The core glass contains a weight percent silica no less than 55%, and titania, germania, and another glass forming oxide, $R_xO_y$, wherein the weight percent ratio of Ti to the sum of Ge and the $R_xO_y$ is less than 1. The x and y values are integers in the range of 1 to 4 and R is selected from the group W, Sn, Pb, and Sb. These four elements are examples from the group of several elements whose oxides form volatile species of oxychlorides or chlorides during the preform chlorine drying step. Any of the several drying and consolidation processes in the art are suitable for use in this invention.

The concentration of $Ti^{+3}$ in a preform made using these compositions are no greater than 100 ppb.

A particularly advantageous feature of titania doping is its low diffusion rate in the blank making process. The titania also acts to preserve the target refractive index profile shape even though co-dopants germania and $R_xO_y$ deposited in the soot laydown process become volatile in a subsequent preform manufacturing step. That is, the titania acts to maintain profile control built into a first preform production step, thus preserving the profile shape through to a final process step from which a draw blank is obtained. The dopant profiles of titania, germania and $R_xO_y$ are deposited to form the blank with the knowledge that some germania and essentially all of the $R_xO_y$ will volatilize.

A fourth aspect of the invention is a method of making an optical waveguide preform including the steps:

a) forming a soot preform by deposition of preselected weight percent ratios of silica to titania to germania onto a target surface;

b) removing $^-OH$ ions from the soot preform by treating the preform at an elevated temperature with chlorine gas;

c) after step b), consolidating, in the presence of $O_2$, the soot preform into a glass body; and, d) forming a cladding layer of silica about the consolidated glass body of step c).

The laydown step and the cladding layer step may be carried out using any of the chemical vapor deposition techniques available in the art. An example of drying and consolidation processes are disclosed and described in U.S. Pat. No. 4,165, 223, Powers.

In a preferred embodiment of the method, the weight ratio of titania to germania is less than 1, and the weight percent silica is no less than 55%.

In another preferred embodiment of the method, titania is present at a weight percent no greater than 7%, germania weight percent is greater than 7%, and the balance of the composition is silica.

In a most preferred embodiment of the method, weight percent titania is no greater than 5%, germania weight percent no less than 16%, the balance of the composition being silica.

DETAILED DESCRIPTION OF THE INVENTION

The subject invention allows one to realize the positive factors associated with using titania as a core dopant, in an optical waveguide fiber, by essentially eliminating the presence of $Ti^{+3}$ and of titania crystal structures in the waveguide core.

What has been discovered is a class of co-dopants and a range of titania and co-dopant concentrations which provide required refractive index profiles, good thermal expansion match between core and clad glasses, and which keep the core substantially free of unwanted $Ti^{+3}$ and titania crystal structures.

Figure 1:
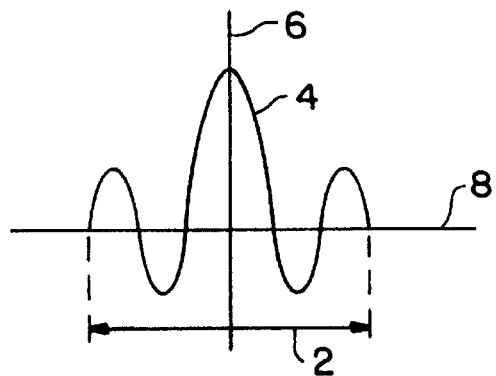
FIG. 1 is a general illustration of a refractive index profile.

A general refractive index profile is shown as 4 in FIG. 1. Refractive index or refractive index Δ, defined above, is charted along the vertical axis 6. Distance from the center of the waveguide core center is charted along horizontal axis 8. A somewhat complicated shape is chosen to highlight the need in the waveguide manufacturing process to accurately achieve a target concentration of refractive index increasing and decreasing dopants along the core diameter, shown as length 2.

A manufacturing problem exists in that the commonly used index increasing dopants, most notably germania, tend to volatilize during an $^-OH$ ion removal step, which usually includes treatment of a soot preform with chlorine gas at temperatures typically above 900° C. It is believed that this volatilization and subsequent redeposition, at a different location in the preform, is the source of the so called diffusion of the dopant. The diffusion is manifested as a smoothing of sharp index profile changes and as the broadening of index profile dimensions.

Whatever the mechanism, the mobility of the dopant results in the distortion of the refractive index profile. The distortion can be severe enough that waveguide fiber properties are adversely affected.

Figure 4:
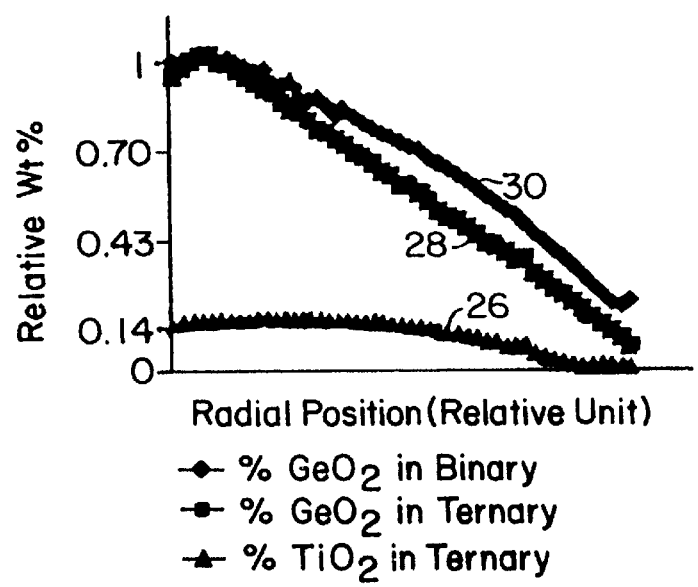
FIG. 4 is a chart showing dopant concentration vs. radial position in the waveguide after chlorine treatment.

FIG. 4 shows an advantageous feature of titania dopant. The chart, made using an electron microprobe, shows relative dopant percent versus radial location in a preform. A parabolic refractive index profile was deposited in the core region of the preform. Curve 26 shows that the titania dopant essentially did not move during the $^-OH$ removal step. In addition, comparing curves 28 and 30, which shows the germania location after the $^-OH$ removal step, serves to illustrate that in the case where titania is present, curve 28, the movement of germania remaining in the preform is greatly reduced. The titania, which was present in the case of curve 28 and absent in the case of curve 30, acts to limit the distortion of the refractive index profile due to germania movement.

A proposed explanation of this phenomenon is, during the $^-OH$ removal step, chlorine combines with germania in the glass according to the reaction equation,

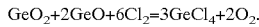
$GeO_2+2GeO+6Cl_2=3GeCl_4+2O_2$.

The oxygen released in the reaction may combine with the $Ti^{+3}$ species according to the reaction equation,

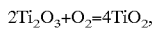
$2Ti_2O_3+O_2=4TiO_2$, thereby eliminating the absorbing species. Furthermore, the oxygen would not be as readily available for recombination with gaseous $GeCl_4$. The dopant would leave the preform and thus would not be deposited in the preform at a location spaced apart from its original deposition location in the preform.

Note that many metal oxides deposited in the preform may be expected to behave in a manner similar to the germania. The inventors therefore contemplate the effectiveness of other metal oxides in the elimination of the $Ti^{+3}$ species. In particular, the inventors have direct experience with $SnO_2$ being swept from the preform in the $^-OH$ removal step and contemplate that W, Pb, and Sb would behave in similar fashion.

It will be understood that the correctness of the proposed mechanism by which dopant mobility is reduced does not in any way limit or define the fact of the mobility reduction.

The amount of germania which must be present to suppress the formation of the $Ti^{+3}$ absorbing species generally is such that the weight percent ratio of titania to germania is less than one. Direct measurement of a preform having a titania to germania weight percent ratio of about 0.3 proved that the $Ti^{+3}$ species was below the detection limit, i.e., 100 ppb, of an electron spin resonance measuring system. Additional measurements, of fiber drawn from the preform, using a spectrophotometer proved the $Ti^{+3}$ concentration is less than 60 ppb.

Figure 2:
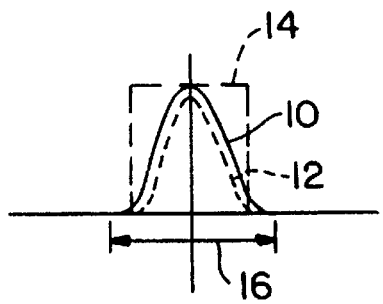
FIG. 2 shows several α refractive index profiles.

Examples of α profiles are shown in FIG. 2. Curve 10 is the parabolic, α=2, index profile, curve 12 the triangular, α=1 profile, and curve 14 is the step index profile described in good approximation by an α profile having α greater than about 4. The length of refractive index profile diameter, 16, in large part determines whether the waveguide fiber is single mode or multimode. A typical core diameter of a single mode waveguide is less than 20 μm, while that of a multimode waveguide is greater than 40 μm.

Figure 3A:
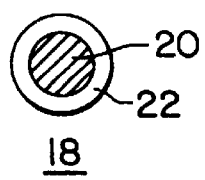
FIG. 3a is a cross section of a preform in an intermediate process stage.
Figure 3B:
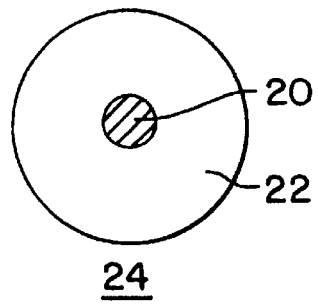
FIG. 3b is a cross section of a draw preform.

FIGS. 3a & 3b are helpful in describing the $^-OH$ removal and soot preform consolidation steps. FIG. 3a is a schematic of a cross section of porous soot preform 18. The central region 20 is the doped silica based glass. Annular region 22, a pure silica region, is sometimes deposited along with the core. Soot preform 18 is heated to a temperature typically above 1000° C. and chlorine gas is caused to flow through the porous soot, thereby removing the light absorbing $^-OH$ ions from the core soot. It is at this point in the process that certain dopants, viz. germania and others as noted above, may combine with the chlorine and so become mobile.

Usually the preform is heated to a higher temperature to consolidate the soot particles into a glass, immediately after chlorine treatment, thereby preventing any recombination of $^-OH$ ions with the glass structure and essentially locking the refractive index profile in place.

In a particular preform manufacturing process, the remainder of the cladding layer is deposited on the consolidated body formed from soot preform 18 to produce the draw preform 24 illustrated schematically in FIG. 3b. The respective core and cladding regions 20 and 22 are shown. Preform 24 is then consolidated into a draw preform from which waveguide fiber may be drawn. Other preform manufacturing methods, such as sleeving a clad tube over the consolidated core preform, are known in the art. The problem of dopant diffusion is present in any of the methods which employ a step including chlorine treatment of a porous preform.

The greater efficiency of titania as a silica glass refractive index dopant is shown by Table 1.

TABLE 1

| Wt. % $GeO_2$ | Wt. % $TiO_2$ | % Δ (Relative Refractive Index) |
|---|---|---|
| 0 | 2.20 | 0.42 |
| 4.00 | 3.00 | 0.84 |
| 9.70 | 8.00 | 2.09 |
| 10.00 | 0.60 | 0.59 |
| 11.80 | 2.70 | 1.11 |
| 13.00 | 1.90 | 1.04 |
| 14.70 | 3.40 | 1.41 |
| 20.00 | 0.00 | 1.00 |
| 40.00 | 0.00 | 2.00 |
| 0.00 | 7.50 | 1.70 |
| 8.00 | 0.00 | 0.35 |

The greater impact of titania on the relative refractive index Δ% is clearly shown, especially in those data rows which have one of the dopants absent from the core. For example, comparing the last two data rows suggests that, at equal weight percents, titania increases refractive index by a factor of 5 more than does germania.

The data in Table 1 was used to generate the fitted equation, $$\%\Delta = 0.049326(\text{wt. }\% \text{ GeO}_2) + 0.214555(\text{wt. }\% \text{ TiO}_2) - 0.001827(\text{wt. }\% \text{ TiO}_2)(\text{wt. }\% \text{ GeO}_2),$$

which again highlights the greater dopant increasing ability of titania.

Thus a novel waveguide fiber core composition has been discovered which:

maintains a target refractive index profile through the $^-OH$ removal and soot consolidation steps;

substitutes a more effective, less costly dopant for a significant fraction of germania;

retains only two core dopants in the optical waveguide fiber;

establishes the composition ratios of the preform dopants, of which there are at least two, which serve to suppress the formation of $Ti^{+3}$; and, reduces thermal stress between core and clad glasses.

Although particular embodiments of our invention have been disclosed and described hereinabove, the invention is nonetheless limited only by the following claims.

We claim:

1. An optical waveguide fiber comprising:
   a core glass region having a core refractive index profile and a maximum refractive index $n_o$; and,
   a clad glass layer, having a minimum refractive index $n_c$, surrounding said core glass region, wherein $n_o > n_c$;
   said core glass consisting essentially of $TiO_2$, $GeO_2$, and $SiO_2$, wherein the weight percent of $TiO_2$ is at most 7% and the weight percent ratio of $TiO_2$ to $GeO_2$ is less than 1.

2. The optical waveguide fiber of claim 1 wherein the weight percent of $TiO_2$ is at most 5% and the weight percent ratio of $TiO_2$ to $GeO_2$, is at most 0.3.

3. The optical waveguide fiber of claim 1 wherein said clad glass layer is essentially $SiO_2$ and the coefficient of thermal expansion of said core glass is essentially equal to the coefficient of thermal expansion of said clad glass.

4. The optical waveguide fiber of claim 1 wherein said optical waveguide fiber is multimode and the refractive index profile of said core glass region is an α profile, wherein α is greater than 1.

5. The optical waveguide fiber of claim 4 wherein said waveguide fiber has a numerical aperture, and the numerical aperture is in the range of 0.18 to 0.32.

6. The optical waveguide fiber of claim 4 wherein α is about 2 and numerical aperture is greater than or equal to about 0.275.

7. An optical waveguide fiber comprising:
   a core glass region having a maximum refractive index $n_o$; and,
   a clad glass layer, having a minimum refractive index $n_c$, surrounding said core glass region, wherein $n_o > n_c$;
   said core glass consisting essentially of $SiO_2$, at a weight percent no less than 55%, $TiO_2$, $GeO_2$ and $R_xO_y$, wherein the weight percent ratio of $TiO_2$ to $GeO_2$ plus $R_xO_y$ is less than 1, x and y are positive integers less than 4 and $R_xO_y$ forms a volatile species in a preform drying step wherein a soot preform is treated with chlorine gas at a temperature above 900° C.

8. The optical waveguide fiber of claim 7 wherein $R_xO_y$ is present in a weight percent no greater than 4% and R is selected from the group consisting of W, Sn, Pb, and Sb.

9. The optical waveguide fiber of claim 7 wherein the concentration of $Ti^{+3}$ is no greater than about 100 ppb.

10. The optical waveguide fiber of claim 7, said waveguide being formed by heating and drawing a draw preform having a refractive index profile shape, said draw preform being formed from a soot preform having a refractive index profile shape, said soot preform being dried in a chlorine atmosphere prior to being consolidated into a glass, wherein the refractive index profile shape of said draw preform is substantially the same as the refractive index profile shape of said soot preform.

11. A method of making an optical waveguide preform comprising the steps:
  a) forming a soot preform by deposition of pre-selected weight percent ratios of silica to titania to germania onto a target surface;
  b) removing $^-OH$ ions from the soot preform by treating the preform with chlorine gas;
  c) after step b), consolidating, in the presence of $O_2$, the soot preform into a glass body; and,
  d) forming a cladding layer of silica about the consolidated glass body of step c).

12. The method of claim 11 wherein the pre-selected weight ratios yield a silica weight percent no less than 55%, and a ratio of titania weight percent to germania weight percent less than one.

13. The method of claim 11 wherein the pre-selected ratios yield a titania weight percent no greater than 7%, a germania weight percent greater than 7%, the balance of the composition being silica.

14. The method of claim 11 wherein the pre-selected ratios yield a titania weight percent no greater than 5%, a germania weight percent no less than 16%, the balance of the composition being silica.

* * * * *